United States Patent [19]

Phlipot et al.

[11] Patent Number: 4,655,246
[45] Date of Patent: Apr. 7, 1987

[54] REGULATED GAS FLOW CONTROL VALVE

[75] Inventors: James R. Phlipot; Steve R. Pingston; Leland E. Segetti, all of St. Louis, Mo.

[73] Assignee: Essex Industries, Inc., St. Louis, Mo.

[21] Appl. No.: 796,803

[22] Filed: Nov. 12, 1985

Related U.S. Application Data

[62] Division of Ser. No. 537,653, Sep. 30, 1985, Pat. No. 4,572,477.

[51] Int. Cl.[4] .............................................. F16K 31/36
[52] U.S. Cl. ........................... 137/505.11; 137/505.25; 137/613; 251/206
[58] Field of Search ............... 137/505.11, 505.25, 137/613; 251/206, 207

[56] References Cited

U.S. PATENT DOCUMENTS

| | | | |
|---|---|---|---|
| 2,887,123 | 5/1959 | Becker | 137/505.11 |
| 2,963,040 | 9/1957 | Zimmer | 137/505.11 |
| 2,973,778 | 3/1961 | Baker | 251/206 |
| 3,211,175 | 10/1965 | Replogle | 137/493 |
| 3,547,143 | 12/1970 | Mills, Jr. | 137/505.11 |
| 3,699,998 | 10/1972 | Baranowski, Jr. | 137/327 |
| 3,762,439 | 10/1973 | Heath | 251/206 |
| 3,848,631 | 11/1974 | Fallon | 137/505.11 |
| 3,926,208 | 12/1975 | Hoffman | 137/505.18 |
| 3,949,966 | 4/1976 | Fabish | 251/206 |
| 4,015,630 | 4/1977 | Contreras | 137/505.25 |

Primary Examiner—A. Michael Chambers
Attorney, Agent, or Firm—Kalish & Gilster

[57] ABSTRACT

A compact, regulated gas flow control valve includes a valve body having a clamp for securement to a high pressure gas cylinder. An inlet at one end receives the high pressure gas from the cylinder. A piston-actuated regulator drops the high pressure to a low pressure, maintaining the low pressure at a substantially constant delivery value. An outlet and a flow control selector knob are located at the other end of the valve body. The knob selects a preselected flow rate for delivery of the low pressure gas by the outlet. The knob controls position of a rotor carrying a plurality or precalibrated flow control orifice inserts, the knob being rotatable but with positive detenting for orienting the rotor to permit flow only through a selected one of the orifice inserts for delivery by said outlet. The sequence of orifice inserts defines a preselected schedule of different flow rates upon rotation of the said selector knob.

18 Claims, 14 Drawing Figures

REGULATED GAS FLOW CONTROL VALVE

BACKGROUND AND SUMMARY OF THE INVENTION

This is a divisional of application Ser. No. 537,653, filed Sept. 30, 1985, now U.S. Pat. No. 4,572,477, issued Feb. 25, 1986.

This invention relates to flow control devices and, more particularly, to a compact, regulated gas glow control valve.

The invention is particularly concerned with controlling the flow of oxygen from oxygen cylinders wherein oxygen is stored at extremely high pressures such as 500-2000 p.s.i.g., there being a requirement to deliver oxygen from such source at a desired, constant flow rate as dictated by medical requirements, such as for emergency treatment, and for hospital, clinical and other usages. Accordingly, it may be required to deliver oxygen at a flow rate which may vary from very little, such as a low as 0.25 liters per minute, up to approximately 15 liters per minute. It is, therefore, desired to provide not only the function of reducing the high pressure to a regulated substantially constant delivery pressure, but also to allow ready preselection of a desired flow rate.

Medical professionals in institutions or other users of such equipment may have different preferences as to the minimum and maximum volumetric flow rates which such apparatus should provide. Further, different users are expected to have different preferences as to the available sequence of flow rates.

For example, one user may prefer a control sequence of 0.5, 0.75, 1, 1.5, 2, 3.5, etc., liters per minute; whereas another user may prefer a sequence of 1, 2, 4, 6, 8, etc., liters per minute, so that the design of such apparatus is rendered difficult for all intended modes of usage. Although the use of vernier controls allowing infinite adjustments of flow rates has been proposed, in medical usage it is preferred to be able to positively and rapidly allow selection only according to such a preferred sequence, thereby assuring rapid, error-reducing selection, as required in prompt emergency treatment and with only definite, defined control positions being available thereby to preclude inaccurate settings, inoperative positions, and to obviate close visual monitoring of selections and flow rates.

It is an object of the present invention to provide a compact, regulated gas flow control valve of improved, advantageous function and design.

It is a further object of the invention to provide such as improved flow control valve which is particularly intended for controlling the flow control of oxygen delivered from a high pressure oxygen cylinder.

It is a further object of the invention to provide such a gas flow control valve which accurately and reliably drops such high pressure to a substantially constant regulated delivery pressure and which allows selection of a precalibrated flow rate of oxygen from said constant delivery pressure only according to a preferred schedule of delivery rates.

Additionally, it is an object of the invention to provide such a gas flow control valve which allows definite, positive selection only of a desired one of a plurality of available flow rates, precluding inaccurate or indefinite settings, inoperative selector positions, and eliminating need for close visual monitoring of the control valve or flow rates provided thereby.

Among other objects of the present invention are the provision of a gas flow control valve which is of extremely compact, streamlined and efficient construction, being both reliable and long lasting in usage as well as relatively light in weight; which is rapidly and conveniently securable to a conventional high-pressure oxygen cylinder; which provides facility for rapid emergency connection to receive oxygen directly at a substantially constant delivery pressure without flow control; and which allows for automatic pressure relief operation.

Briefly, a regulated gas flow control valve of the invention includes a single valve body having clamp means at one end for clampingly securing the valve body directly to a source of high presusre gas, such as an oxygen clyinder, there being an inlet for this purpose at one end of the valve body for directly receiving the high pressure gas for such source and admitting the gas to the interior of the valve body. The clamp arrangement causes the body to be tightly maintained in communication with the gas source. Within the valve body, which is of compact configuration, there is a regulator for dropping the high pressure to a low pressure and for maintaining the low pressure substantially constant. The regulator includes a valve seat to which said inlet permits communication of said gas at high pressure. A valve member including a seal is positioned within the valve body for axial movement between closing and opening positions. In the open position, the seal is unseated from the seat to open the inlet and to admit gas at high pressure into an inlet chamber surrounding the valve seat. In the closed condition, the valve member causes the seal to be positioned against said seat to block the inlet and to limit or prevent gas from being admitted to the inlet chamber. As the gas enters the inlet chamber upon opening movement of the valve body, the gas is permitted to expand into the inlet chamber. A piston, also within the valve body, is axially movable therein, being connected to the valve member for corresponding movement thereof in response to piston movement. A compression spring within the valve body resiliently biases the piston in a direction for opening movement of the valve body. A piston chamber is defined, also within the valve body, over the piston head, there being a gas conduit providing communication between the inlet chamber and the piston chamber for admitting low pressure gas to the piston chamber for exerting pressure upon the piston head, and causing the piston to move to a position urging the seal of the valve member against the valve seat to an extend causing pressure within the piston chamber to be maintained at a substantially constant delivery pressure. A rotor is positioned proximate the piston chamber, and is fitted with a plurality of precalibrated orifice means, each configured for receiving the gas at said constant delivery pressure. A selector at one end of the valve body opposite from the inlet is provided for rotating the rotor relative to a gas outlet port for delivery of the gas, such as oxygen, at a precalibrated flow rate determined uniquely by respectively one of the orifice means. A positive detent mechanism assures that the only positions of the rotor may be for completely preventing flow of the gas or permitting flow only through one of the orifice means.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
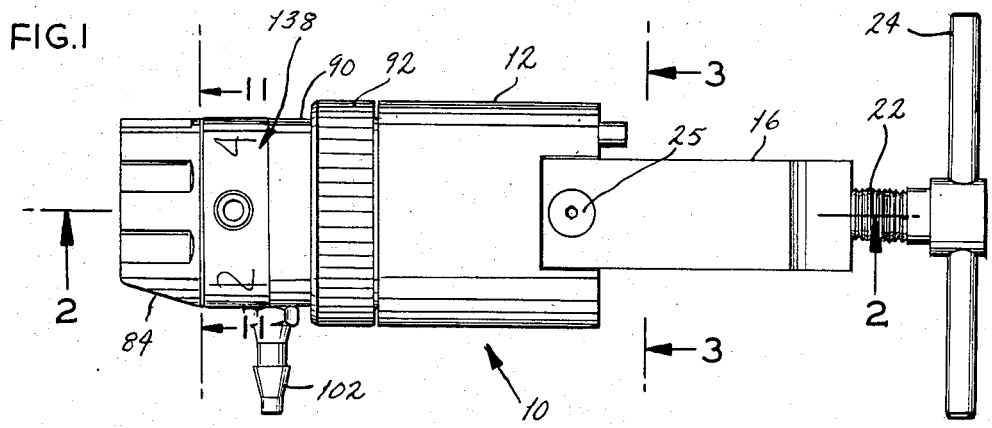
FIG. 1 is a side elevation view of a regulated gas flow control valve in accordance with and embodying the prsent invention.

Referring now by reference numerals to the drawings, indicated generally at 10 in its entirety is a compact, regulated gas flow control valve of the invention. Valve 10 is especially designed and intended for ready attachment to an oxygen cylinder (not shown) or other high pressure source of gas. The new valve may be used for providing a predetermined sequence of flow rates at a substantially constant delivery pressure such as about 5-50 p.s.i.g. even though the source pressure may be, for example, 500-2000 p.s.i.g.

Although especially suited for delivery of oxygen for emergency, clinical and hospital use, as in ambulances, emergency rooms and in other medical facilities, the new control valve is useful also for controlling the dispersing of other gases such as specialty gases within the medical, scientific and commercial fields.

Valve 10 includes a single body 12 of cylindrical form, being entirely compact and small in dimensions, as of diameter of about 3.5 cm. formed, for example, of aluminum alloy, stainless steel or brass. For facile, rapid attachement of valve 10 to an oxygen or similar high pressure cylinder, body 12 is provided at what may be termed its lower, or inner, end with a bracket or yoke 14 of generally U-shaped configuration including upstanding leg portions 16, 16' and a relatively thicker end portion 18 which is bored and tapped at 20 to receive a clamp screw 22 having a T-shaped handle 24. Screws 25, 25' affix the yoke legs to valve body 12.

At 26 is designated an inlet having an inlet port or bore 26a dimensioned for being maintained, upon tightening of screw 22, in tight communication with the conventional outlet of the gas cylinder to which valve 10 is secured, thereby admitting gas at high pressure, such as up to about 2000 p.s.i.g. to port 26a.

A pair of pins 27, 27' are spaced relative to inlet 26 for being received by corresponding recesses conventionally available upon the gas cylinder, thereby to precisely fix valve 10 against rotation relative to the cylinder and with inlet 26 in proper alignment.

A mesh filter 28 is fitted within bore 26a, being maintained by tight fitment against the shoulder formed by a smaller diameter passage 30, which in turn connects to a smaller diameter passage 32. Passage 32 opens into an inlet chamber 34 through an annular valve seat 35 which protrudes into the chamber 34 a small distance for definitive engagement by a valve seal 36.

Seal 36 is carried at the lower end of a valve member 38 of cylindrical form carried by a piston 40 axially slidable within a cylindrical bore 42. A reduced diameter stem 44 of the valve member is, for this purpose, fitted closely into a central bore of piston 40. Valve member 38 is shown in valve-opening position with seal 36 fully lifted from seat 35, being the position occupied when gas is not supplied at high pressure through inlet 26. However, piston 40 and valve member 38 are axially movable to a closing position, explained below, in response to gas supplied through passage 26a.

Figure 12:
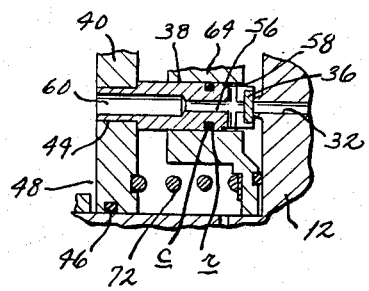
FIG. 12 is a partial longitudinal cross sectional view illustrating movement of a certain piston and valve member within the valve.

Fitted within an annular groove around piston 40 is an O-ring 46 whereby pressure may be developed and maintained within a piston chamber or headspace 48 over the head 50 of the piston, even though the piston may move in response to such pressure (as in FIG. 12) within bore 42. Opening through the wall of the valve body into said bore is a passage 52 whereby the valve body interior 54 defined by said bore 42 is at atmospheric pressure.

Valve member 38 is drilled to provide a cruciform-configured passage 56 opening laterally at opposite sides into an annular groove 58 whereby there is communication at all times between inlet chamber 34 and the cruciform passage 56. The latter connects to a larger diameter passage 60 which opens into the headspace 48, thereby permitting pressure to be developed within such headspace whenever gas is admitted to inlet chamber 34 by opening movement of valve member 38. Valve member 38 spacedly from cruciform passage passage 56 is provided with a circumferential outwardly opening recess c accepting a gasket or O-ring r for a sealing relationship between valve member 35 and guide 62 whereby inadvertent escape of gas into valve body interior 54 for ultimate loss through passage 52 is inhibited.

Surrounding a guidingly receiving valve member 34 is a flanged annular guide 62 having a central portion 64 and a hex-shaped flange portion 66, the latter being centrally recessed to define, together with the lower end wall 68 of bore 42, said inlet chamber 34. An annular groove upon the lower face of flange portion 66 carries an O-ring or V-edged seal ring 70 for providing gas-tight sealing against end wall 68 when urged thereagainst. For that purpose, a coiled compression spring 72 bears against a washer 74 seated upon the flange portion 66 and, at its opposite end, against piston 40, being received within an annular groove 76 of the piston.

Normally, spring 72 maintains guide 62 in the position shown, preventing gas under pressure within inlet chamber 34 from entering space 54 and being thereby vented to atmosphere through port 52, But if, upon high pressure initially developing within inlet 26a, as upon connection to the gas cylinder or turning on of the latter's valve, or other transient conditions, excess pressure initially should develop within chamber 34, the high pressure may cause momentary movement of guide 62 toward piston 40. This will relieve any high pressure in chamber 34 until normal valve-closing operation of piston 40, as explained below, can occur to close seal 36 upon seat 35.

Figure 4:
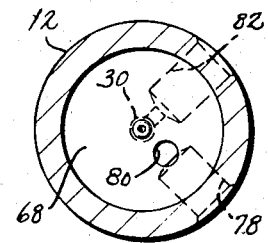
FIG. 4 is a lateral cross section, as taken along line 4—4 of FIG. 2.
Figure 5:
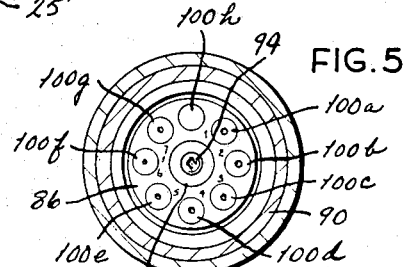
FIG. 5 is a lateral cross section of the valve as taken generally along line 5—5 of FIG. 2.

Referring to FIG. 4, located below the pressure regulator just described is a threaded opening 78 which communicates with a port 80 opening into end wall 68 at a point located within inlet chamber 34. Opening 78 may be provided with a removable plug or else a capped or valved emergency fitting (not shown) whereby reduced pressure gas, e.g., oxygen, can be directly obtained from chamber 34 for the purpose of attaching additional medical devices requiring a higher flow rate.

Also depicted is a threaded opening 82 for receiving a conventional pressure gauge (not shown). Opening 82 communicates with passage 30 whereby such gauge will be caused to display the pressure in the gas cylinder. If such gauge is not employed, a plug is threaded into opening 82.

Valve 10 also includes flow control valve means including a control knob 84 at the upper end of the valve for allowing an operator to select a predetermined rate of gas flow from an available schedule of flow rates, or to select no gas flow.

For this purpose, there is provided a disc-shaped rotor 86 carried by a shaft 88 connected to knob 84 for extending coaxially through a cylindrical extension 90 of valve body 12, to which the extension is secured as by a ring 92 which in threaded engagement with body 12 for convenient removal of extension 90, and with knob 84 and rotor 86 secured and intact to permit changing of rotor 86 for purposes presently appearing or for inspection, etc.

Rotor 86 is removably secured to shaft 88 by a screw 94 seated upon a flat washer 96a and a Belleville-type spring washer 96b. The latter provides a tightly clamped, yieldable relationship between rotor 86 and shaft 88. An O-ring 98 provides gas-tight sealing of shaft 88 within body extension 90.

Figure 7:
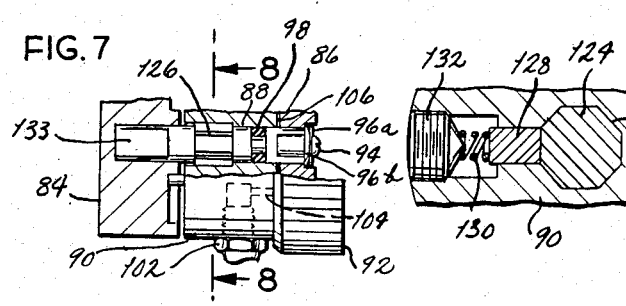
FIG. 7 is a fragmentary view, partly in cross section, illustrating certain gas flow distribution structure within the valve.
Figure 9:
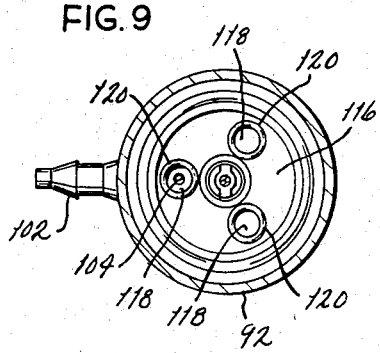
FIG. 9 is a lateral cross section illustrating certain features of the gas flow distribution structure.

The lower face of rotor 86 is oriented toward piston face 50 without intervening structure and with there being only said head space 48 therebetween. Carried by the rotor are a plurality of flow control orifice means or inserts 100a-g each uniquely determining or defining a precalibrated gas flow rate to be provided by valve 10 through an outlet fitting 102 (FIGS. 7 and 9). Also carried by the rotor is an insert 100h which is closed, or may have a blank space, to provide for zero gas flow.

Referring to FIG. 7, fitting 102 is threaded into body extension 90 and communicates to the upper side of rotor 86 through a passage 104 opening into the ceiling of a recess 106 in which rotor 86 is located, and in alignment with each of the orifice fittings. Further, rotor 86 is provided with eight apertures 108 of fixed size which open from the upper face of the rotor into respective cavities, as at 110 for receiving the orifice fittings.

Figure 2:
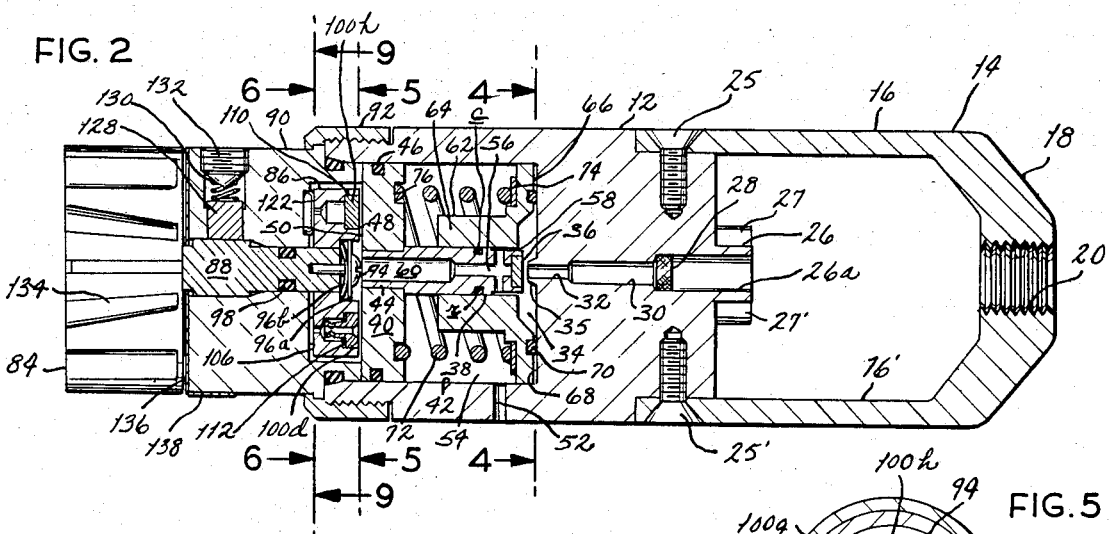
FIG. 2 is a longitudinal cross sectional view as taken generally along line 2—2 of FIG. 1.
Figure 3:
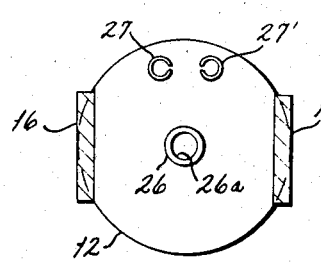
FIG. 3 is a lateral cross section as taken along line 3—3 of FIG. 1.

Referring to FIG. 2, each such orifice fitting, as that shown at 100d, is provided with an orifice of unique, precise size including a flanged portion and a smaller diameter stem portion, and sealed within its cavity by a gasket 112. The body of the rotor may be of synthetic material, e.g., polysulfone, while each orifice fitting is of brass, etc.

It is specifically preferred to provide each orifice fitting with a characteristic finish, colored, e.g., blue, yellow, gray, etc., according to the flow rate it will provide. Since each such insert is exposed to a substantially constant delivery pressure, e.g., 50 p.s.i.g. present within head space 48, its flow rate will be dependent upon the orifice dimensions.

It is preferred to precalibrate each such insert 100a-100f according to the precise flow rate it demonstrates in testing apparatus prior to assembly of the valve, and at a given source pressure. Accordingly, the precalibrated flow rate can be correlated with the color of each insert, and assembly is facilitated by the assurance that placement of the inserts sequentially within their rotor cavities according to a desired color scheme will provide a preselected sequence of precise flow rates, such as 0.5, 1.0, 1.5, 2.0, 3.0, 4.0 and 5.0 liters per minute. The blank insert 100g provides zero flow rate.

Figure 13:
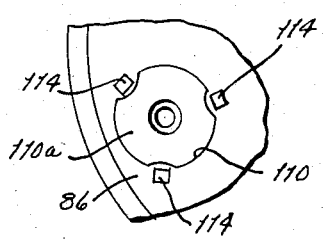
FIG. 13 is an enlarged fragmentary view of a protion of FIG. 5, illustrating a certain precalibrated orifice means of the invention and its securement.

The gasket 112 in each cavity assures that gas flow will occur only through the given orifice dimensions. Referring to FIG. 13, each insert 100a, etc., is maintained tightly within its recess 110, clamped against the respective gasket, by staking at three points 114 in the rotor surface surrounding the insert.

In order to assure of gas tight relationship against the upper face of the rotor, the opposed ceiling 116 (FIG. 9) of cavity 106 is provided with three shallow cylindrical recesses 118 receiving respective O-rings 120 for bearing against the upper rotor face 122 in equispaced, even relationship, and with passage 104 opening through one only of recesses 188 (FIG. 9). The spring washer 96b resiliently urges face 122 tightly against such O-rings 120, whereby only gas through a predetermined one of orifice fittings 100a-f will be delivered to fitting 102.

Figure 6:
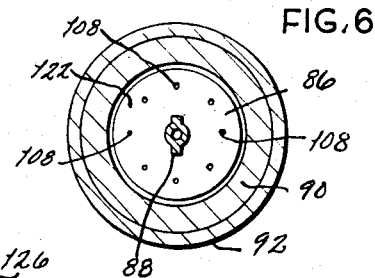
FIG. 6 is similarly a lateral cross section of the valve as taken generally along line 6—6 of FIG. 2.
Figure 8:
FIG. 8 is a fragmentary lateral cross section as taken generally along line 8—8 of FIG. 7.

Referring to FIG. 8, a portion 124 of shaft 88 is octagonal to provide a cam surface 126 against which a pawl 128 is urged by a spring 130 secured by a screw 132, thereby providing a positive detent mechanism for shaft 88, knob 84 and rotor 86 as a unit. Provided also is a keyway 128 (FIG. 6) within rotor 86 for receiving a keyed portion 130 (FIG. 9) of the shaft for assuring of a fixed relationship between the rotor and the shaft, as will facilitate location of inserts 100a-g in their proper sequence, and to prevent slippage of the rotor upon the shaft. Knob 84 similarly may be secured to as by a set screw to a keyed or flatted portion 132 (FIG. 7) of the shaft.

Figure 10:
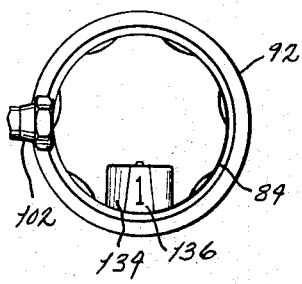
FIG. 10 is a left end elevation view of the new valve.

It is preferred to provide in knob 84 a relatively deep notch 134 (FIG. 10) for permitting observation of an index plate 136 carrying indicia, such as "1" shown, indicating a selected flow rate, e,g., 1.0 liter per minute, the same being clearly visible through the notch from above knob 84. Additionally, indicia are located, as at 138 generally, around the side surface of body extension 90.

Figure 11:
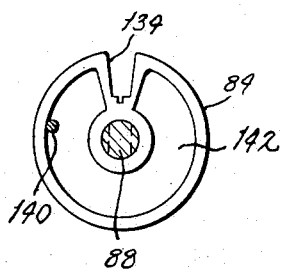
FIG. 11 is a lateral cross section illustrating features of a certain selector of the valve, as taken generally along line 11—11 of FIG. 2.

Limitation of rotation of knob 86 between desired arcuate limits is provided, according to one preferred arrangement, as shown in FIG. 11, which may be compared with FIG. 7. A pin 140 extends upwardly from body extension 90 for being received within an arcuate recess 142 in the lower face of the knob.

Figure 14:
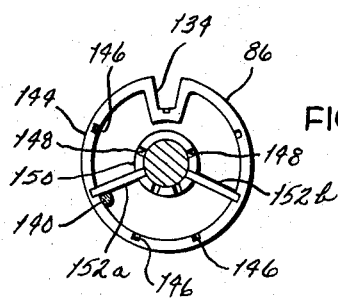
FIG. 14 is a lateral cross sectional view like FIG. 11 but illustrating a different orientation of the selector for limiting its movement between selected arcuate limits.

Referring to FIG. 14, another arrangement for limiting rotation of a modified knob 86' is provided. Around a flange or lip 144 of the knob are spaced notches 146 aligned radially with corresponding notches 148 within an inner flange or hub 150. Shown bridging two pairs of these inner and outer notches are removable bars 152a, 152b and with stop projection 140 engaging bar 152a to limit further counterclockwise rotation (as viewed from the rear) of knob. Similar, bar 152b will limit clockwise rotation. The bars may be removed entirely or placed as desired to limit rotation of the knob to movement between preselected position. Thus, for example, oxygen flow may be limited to flow of from 1.0 to 2.0 liters per minute by simply locating bars 152a, 152b to preclude selection of other flow values. This allows medical personnel to configure valve 10 so that a patient may not select an oxygen flow level which would be harmful.

In operation of the new valve, it is clamped to an oxygen cylinder, for example, admitting high pressure gas into chamber 34 through valve seat 35. Any transient overpressure is vented to atmosphere momentarily by relief valve movement of sleeve 64, as explained above.

The pressure developing in chamber 34 is communicated through passage 56 to headspace 48, exerting force on piston 40 for closing movement of valve member or piston rod 38. The seal 36 is, accordingly, urged toward seat 35 to limit further entry of gas into chamber.

During flow of gas through the valve and from outlet 102, as for medical usage, for example, piston 40 will be driven by pressure in headspace or chamber 48 to a position, opposed by spring 72, to maintain the pressure in chamber 48 at a substantially constant delivery value such as about 50 p.s.i.g. Such valve may be changed by changing spring 72 to one having a different spring constant. If pressure drops in chamber 48 below the delivery value, spring 72 will urge the piston upwardly for increasing the volume of gas entering chamber 34. Or, if pressure in chamber 48 rises above the delivery value, the piston will be driven to a position closing or restricting valve seat 35 for limiting flow of gas into chamber 34. To the extent valve member opens from seat 35, gas expands into chamber 34 with drop in pressure.

Such gas at substantially constant, thus regulated delivery pressure is made available to each of the orifice inserts 100a but may flow only through such one of inserts 100a-g as in aligned with passage 104 by positioning of selector knob 84. Positive positioning of the knob is assured by the detent mechanism shown in FIG. 8.

The new valve is seen not only to be compact and of relatively streamlined, modern design but also to be reliable, tamper-resistant, fail-safe and highly advantageous to utilize in a rapid, facile manner, providing numerous advantages of construction and operation. Accordingly, the obejcts of the invention and other advantageous results are believed.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing descriptionor shown in the accompanying drawings shall be interpreted as illustrative rather than limiting.

What is claimed is:

1. In a compact, regulated gas flow control apparatus including a body, an inlet at one end of said body for receiving gas at high pressure from a source thereof, regulator means for dropping the high pressure to a low pressure and maintaining the low pressure at a substantially constant delivery value, said regulator means including a valve seat within said valve body, a valve member for movement relative to said valve body, and a piston movable within said body in response to pressure within said valve body for controlling movement of said valve member to provide regulated delivery of the low pressure gas at a substantially constant delivery value, an outlet, and delivery means for delivery of the low pressure gas by said outlet, the improvement comprising an atmospheric vent and pressure relief means separate from said piston and movable relative to said piston for overpressure venting of gas received from said source to atmosphere if received through said inlet at excessive, said pressure relief means comprising a movable guide within said cavity coaxially surrounding and guiding said valve member, said spring interengaging said guide and piston for urging said piston toward one end of said cavity and for urging said guide toward the other end of said cavity.

2. A compact regulated gas flow control valve comprising a valve body, clamp means for clampingly securing said valve body to a source of high pressure gas, an inlet at one end of said valve body for receiving the high pressure gas and admitting the gas to the interior of the valve body, the clamp means causing the inlet to be tightly maintained in communication with said source, a regulator for dropping the high pressure to a low pressure and for maintaining the low pressure substantially constant, said regulator comprising a valve seat to which said inlet provides communication of the gas at high pressure, a valve member including a seat for axial movement within said valve body between a closing position seating said seal upon said seat to restrict entry of gas into the valve through said inlet and an opening position unseating said seal to increase flow of gas into the valve through said inlet, an inlet chamber surrounding said valve seat for receiving gas through said seat when said seal is unseated therefrom to permit expansion of the gas entering the chamber, and axially movable piston within said valve body connected to said valve member, spring means for resiliently biasing said piston in a direction for movement of said valve body to an opening position, sadi piston being movable within a piston chamber, said piston having a head for driving said piston axially for closing movement of said valve body in response to low pressure gas within said piston chamber, a gas conduit providing communication between said inlet chamber and piston chamber for admitting low pressure gas to said piston chamber, said low pressure gas within said piston chamber causing said piston to move to a position urging said seal toward said valve seat by an amount causing pressure within said piston chamber to be maintained at a substantially constant delivery pressure, a rotor including flow control orifice means for receiving the gas at said delivery pressure a gas outlet port, selector means for rotating said rotor relative to said outlet port for delivery of said gas at a precalibrated flow rate determined said orifice means, an atmospheric vent in said valve body, and pressure relief means separate from said piston and movable relative to said piston for overpressure venting of gas received from said source to atmosphere if received through said inlet at excessive pressure, said pressure relief means comprising a movable guide within said cavity coaxially surrounding and guiding said valve member, said spring interengaging said guide and piston for urging said piston toward one end of said cavity and for urging said guide toward the other end of said cavity.

3. A compact regulated gas flow control valve comprising a valve body, clamp means for clampingly securing said valve body to a source of high pressure gas, an inlet at one end of said valve body for receiving the high pressure gas and admitting the gas to the interior of the valve body, the clamp means causing the inlet to be tightly maintained in communication with said source, a regulator for dropping the high pressure to a low pressure and for maintaining the low pressure substantially constant, said regulator comprising a valve seat to which said inlet provides communication of the gas at high pressure, a valve member including a seal for axial movement within said valve body between a closing position seating said seal upon said seat to restrict entry of gas into the valve through said inlet and an opening position unseating said seal to increase flow of gas into the valve through said inlet, an inlet chamber surrounding said valve seat for receiving gas through said seat when said seal is unseated therefrom to permit expansion of the gas entering the chamber, an axially movable piston within said valve body connected to said valve member, spring means for resiliently biasing said piston in a direction for movement of said valve body to an opening position, said piston being movable within a piston chamber, said piston having a head for driving said piston axially for closing movement of said valve body in response to low pressure gas within said piston chamber, a gas conduit providing communication between said inlet chamber and piston chamber for admitting low pressure gas to said piston chamber, said low pressure gas within said piston chamber causing said piston to move to a position urging said seal toward said valve seat by an amount causing pressure within said piston chamber to be maintained at a substantially constant delivery pressure, a rotor proximate said piston chamber, a plurality of precalibrated flow control orifice means carried by said rotor each adapted for receiving the gas at said delivery pressure a gas outlet port, selector means for rotating said rotor relative to said outlet port for delivery of said gas at a precalibrated flow rate determined uniquely by a respective one of said orifice means, an atmospheric vent in said valve body, and pressure relief means separate from said piston and movable relative to said piston for overpressure venting of gas received from said source to atmosphere if received through said inlet at excessive pressure, said pressure relief means comprising a movable guide within said cavity coaxially surrounding and guiding said valve member, said spring interengaging said guide and piston for urging said piston toward one end of said cavity and for urging said guide toward the other end of said cavity.

4. A gas flow control apparatus according to claim 2 further comprising flow control means including a rotor, a plurality of precalibrated flow control orifice means carried by said rotor, and selector means for orienting said rotor to permit flow only through a selected one of said orifice means at said delivery pressure for delivery by said outlet, said flow control orifice means defining a preselected schedule of different flow rates upon operation of said selector means, said flow control orifice inserts spaced at arcuate intervals around said rotor.

5. A gas flow control apparatus according to claim 4, said inserts being individually precalibrated to provide a fixed flow rate and positioned within recesses of said rotor.

6. A gas flow control apparatus according to claim 5, said inserts being individually of different colors corresponding to a precalibrated flow rate to permit location around said rotor according to said preselected schedule.

7. A gas flow control apparatus according to claim 6, said gas at constant delivery pressure being provided by said regulator means to one side of said rotor, and passage means providing communication from the other side of the rotor from a selected one of said orifice insert to said outlet.

8. A gas flow control apparatus according to claim 7, said rotor being rotatable within a cavity, said passage means opening into said cavity proximate a face of said rotor, seal means associated with said passage means, and means resiliently biasing said rotor for contact of said rotor face with said seal means.

9. A gas flow control valve according to claim 8, said selector means compirsing a selector knob at one end of said body, a shaft interconnecting said knob and said rotor, fastening means for securing said rotor to said shaft, said resilient biasing means comprising a spring interposed between said rotor and said fastening means.

10. A gas flow control apparatus according to claim 9, said knob, shaft rotor being contained within a body extension, means for removably affixing said body extension to said body and for permitting ready removal thereof, said rotor and fastening means being exposed upon removal of said body extension, thereby to permit changing of said rotor to establish a different schedule of flow rates.

11. A gas flow control apparatus according to claim 4, said selector means comprising a selector knob at one end of said body, a shaft interconnecting said knob and said rotor, and detent means associated with said shaft for allowing knob movement only to one of a plurality of positively fixed positions selecting delivery of gas through said orifice means, or for selecting no delivery of gas.

12. A gas flow control apparatus according to claim 3, said valve member including a valve seal adapted for movement in said valve body between a closing position seating said seal upon said valve seat to restrict entry of gas through said inlet and an opening position unseating said seal from said seat to increase entry of gas through said inlet, means defining a headspace over said piston, passage means for permitting flow of gas through said valve seat to said headspace, said piston being moved in first direction for closing movement of said valve body in response to increasing pressure in said headspace, a spring for resisting said movements of said piston, whereby movement of said piston causes regulation by said valve member to maintain pressure at said substantially constant delivery value to be maintained within said headspace.

13. A gas flow control apparatus according to claim 12, said valve body defining an axial cavity therewithin for said piston, said spring and said valve member, said piston and valve member being coaxial within said cavity and axially movable therein.

14. A gas flow control apparatus according to claim 13, said pressure relief means comprising a movable guide within said cavity coaxially surrounding and guiding said valve member, said spring interengaging said guide and piston for urging said piston toward one end of said cavity and for urging said guide toward the other end of said cavity.

15. A gas flow control apparatus according to claim 14, said vent comprising a port venting said cavity to atmosphere, said guide and port being relatively located for permitting relief-valving movement of said guide for overpressure venting through said port.

16. A gas flow control apparatus according to claim 12, said rotor having a face oriented proximate said piston in spaced relationship to the head of said piston, defining said headspace between said head and said rotor, and whereby the low pressure gas at said constant delivery pressure is made available to said rotor for flow through the selected orifice means.

17. A gas flow control valve according to claim 13, said vent comprising a port venting said cavity to atmosphere, said guide and port being relatively located for permitting relief-valving movement of said guide for overpressure venting through said port.

18. A gas flow control valve according to claim 17, said guide comprising a radial flange, said flange carrying an annular seal for being urged against said other end of said cavity in sealing relationship with said other end, said flange surrounding said valve seat, said sealing relationship normally preventing gas received from said high pressure source through said inlet from being vented to atmosphere, said port providing communication through a wall of said chamber to atmosphere at a location normally on one side of said port between said flange and said piston, said flange being shiftable toward said piston in response to overpressure to a position permitting radially outward flow of gas between said annular seal and said other end of said cavity and around the periphery of said flange for venting of the overpressure through said port.

* * * * *

UNITED STATES PATENT AND TRADEMARK OFFICE
CERTIFICATE OF CORRECTION

PATENT NO.  : 4,655,246

DATED       : April 7, 1987

INVENTOR(S) : Phlipot, Pinkston, Seghetti

It is certified that error appears in the above-identified patent and that said Letters Patent is hereby corrected as shown below:

On the title page:

Printed name of inventors:  "Steve R. Pingston" should be -- Steve R. Pinkston --

"Leland E. Segetti" should be -- Leland L. Seghetti --

Signed and Sealed this

Second Day of February, 1988

*Attest:*

DONALD J. QUIGG

*Attesting Officer*            *Commissioner of Patents and Trademarks*